(12) United States Patent  (10) Patent No.: US 8,529,652 B2
Burkhardt  (45) Date of Patent: Sep. 10, 2013

(54) SOOT PARTICLE FILTER

(76) Inventor: Roswitha Burkhardt, Oberwolfach (DE)

( * ) Notice: Subject to any disclaimer, the term of this patent is extended or adjusted under 35 U.S.C. 154(b) by 434 days.

(21) Appl. No.: 12/743,455

(22) PCT Filed: Nov. 19, 2008

(86) PCT No.: PCT/EP2008/009785
§ 371 (c)(1),
(2), (4) Date: Jun. 8, 2010

(87) PCT Pub. No.: WO2009/065572
PCT Pub. Date: May 28, 2009

(65) Prior Publication Data
US 2010/0275585 A1  Nov. 4, 2010

(30) Foreign Application Priority Data
Nov. 19, 2007  (DE) ............ 20 2007 016 125 U

(51) Int. Cl.
*B01D 50/00* (2006.01)
*B01D 39/14* (2006.01)
*B01D 39/06* (2006.01)
*B01D 24/00* (2006.01)

(52) U.S. Cl.
USPC ............ 55/282.3; 55/522; 55/524; 55/523; 422/169; 422/170; 422/171; 422/172; 422/177; 422/178; 422/179; 422/180; 422/181; 422/182

(58) Field of Classification Search
USPC ............ 55/522–524, 282.3; 422/169–172, 422/177–182
See application file for complete search history.

(56) References Cited

U.S. PATENT DOCUMENTS

| 3,086,852 | A | * | 4/1963 | Fenske et al. | 422/635 |
| 4,054,418 | A | * | 10/1977 | Miller et al. | 422/171 |
| 4,419,113 | A | * | 12/1983 | Smith | 55/484 |
| 4,449,362 | A | * | 5/1984 | Frankenberg et al. | 60/274 |
| 4,617,289 | A | * | 10/1986 | Saito et al. | 502/339 |
| 4,828,807 | A | | 5/1989 | Domesle et al. | |
| 4,858,431 | A | | 8/1989 | Leonhard et al. | |

(Continued)

FOREIGN PATENT DOCUMENTS
DE  198 21 869  11/1999
DE  199 23 781  12/2000

(Continued)

*Primary Examiner* — Amber Orlando
(74) *Attorney, Agent, or Firm* — Preti Flaherty Beliveau & Pachios LLP

(57) ABSTRACT

A soot particle filter according to the invention can be particularly used in motor vehicles or heating systems using liquid and solid fuels. The device is particularly characterized by a time controlled variable regeneration of the soot particle storage (10) and soot particle burn-off. The device is in particular catalytic. The device comprises at least one filter housing (2) having an input (3), an output (4) and a filter element (6). A soot particle storage chamber (10) is further provided in the filter housing (2) and comprises an access (19) that is particularly angled and tapered toward the inside. The inner chamber of the soot particle storage (10) is lined with precious metal discs (11). Said discs have holes, are angled and/or corrugated. The precious metal discs and/or a precious metal mesh (11) are at least partially catalytically coated. An ignition device (12) is arranged in the filter housing (12), for example a glow plug and/or a glow filament.

4 Claims, 2 Drawing Sheets

(56) References Cited

U.S. PATENT DOCUMENTS

| | | | |
|---|---|---|---|
| 4,985,211 A * | 1/1991 | Akiyama et al. | 422/171 |
| 5,470,364 A * | 11/1995 | Adiletta | 55/484 |
| 5,707,499 A * | 1/1998 | Joshi et al. | 204/230.5 |
| 5,935,525 A * | 8/1999 | Lincoln et al. | 422/121 |
| 6,117,592 A * | 9/2000 | Hoshino et al. | 429/235 |
| 6,572,682 B2 * | 6/2003 | Peter et al. | 95/278 |
| 7,108,739 B2 * | 9/2006 | Iyer et al. | 95/283 |
| 7,198,762 B1 * | 4/2007 | Teboul | 422/174 |
| 7,473,288 B2 * | 1/2009 | Toyoda et al. | 55/282.3 |
| 7,582,141 B2 * | 9/2009 | Ehlers | 95/280 |
| 8,020,377 B2 * | 9/2011 | Winter et al. | 60/295 |
| 2002/0050479 A1 * | 5/2002 | Scott | 210/748 |
| 2005/0201924 A1 * | 9/2005 | Ramani et al. | 423/576.8 |
| 2005/0239642 A1 * | 10/2005 | Kim et al. | 502/219 |
| 2005/0284139 A1 * | 12/2005 | Verkiel et al. | 60/297 |
| 2006/0272319 A1 * | 12/2006 | Dettling et al. | 60/295 |
| 2007/0183952 A1 * | 8/2007 | Jordan et al. | 423/212 |
| 2008/0069741 A1 * | 3/2008 | Koermer et al. | 422/171 |
| 2009/0035192 A1 * | 2/2009 | Hwang | 422/170 |
| 2010/0206248 A1 * | 8/2010 | Mok | 122/17.1 |

FOREIGN PATENT DOCUMENTS

| | | |
|---|---|---|
| DE | 10 2004 020 146 | 11/2005 |
| DE | 10 2005 044 491 | 3/2007 |
| EP | 0 849 444 | 6/1998 |
| EP | 1 262 641 | 12/2002 |
| JP | 05-332123 | 12/1993 |
| WO | WO 99/05402 | 2/1999 |

* cited by examiner

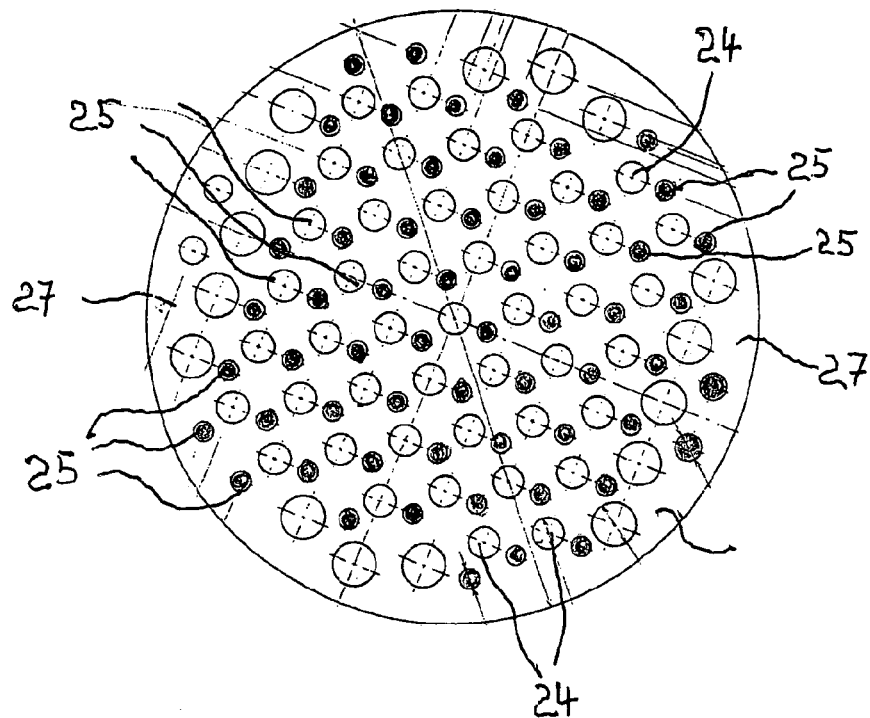
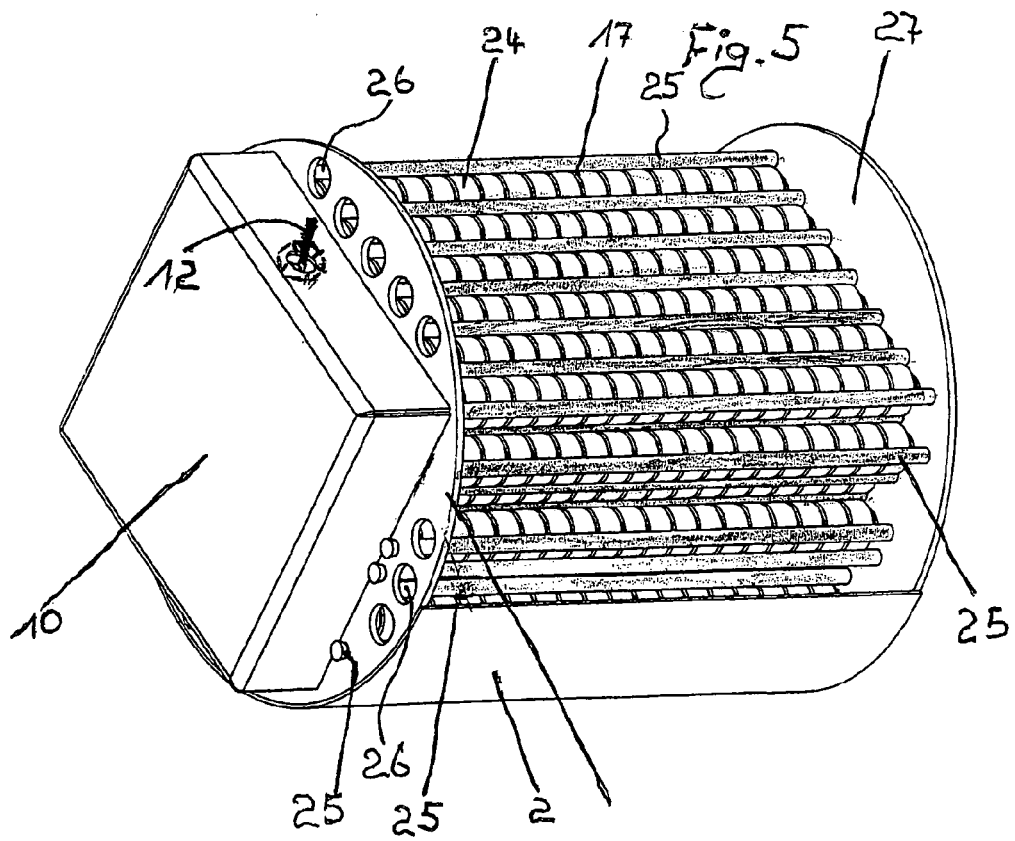

SOOT PARTICLE FILTER

The invention relates to a device for filtering the exhaust gases of heating systems or internal combustion engines burning liquid or solid fuels, and is designed for use especially in motor vehicles. It should be noted that the invention can be used with any type of burner regardless of its specific mode of operation or the type of fuel.

Filter systems of that nature are expected to adequately capture the soot particles or other solids in the exhaust gas of internal combustion engines, heating-system burners or furnaces, especially those running on liquid and/or solid fuels. They are also expected to screen out as much as possible harmful components in the exhaust gas. Moreover, a filtering device should continuously function with consistently high soot-absorption efficiency for an extended operating period and life cycle. Finally, a filtering device should decontaminate the exhaust gas in reasonably maintenance-free fashion. A filtering device of that nature negatively affects the output of a furnace and reduces the mechanical power of an internal combustion engine, especially that of a diesel engine.

There exist numerous designs of particle filters and oxidation-type catalytic converters. The soot particles travel in the exhaust-gas flow for instance into metal or ceramic filter bodies to be collected. An electric heating element then burns these soot particles. For regeneration and for oxidation the filters are coated with various precious metals, as described for instance in the German patents DE 10200504449 and DE 19923781 and the European patents EP 1262641 and EP 0998627/WO 9905402. The problem with these earlier soot particle filters lies primarily in the fact that enduring performance is not assured. At excessive combustion temperatures the filter medium often becomes porous and/or unstable. There is also the risk of particles separating from the filter medium and exiting into the environment.

Then there are also chemicals that are used for igniting and burning-off the soot particles. They are temporarily injected into the diesel fuel to increase or decrease the exhaust gas temperature. That alternative approach can potentially cause other hazardous pollutants to escape into the environment. Besides, that technique is cumbersome and cost-intensive. Experience has shown that treatment with chemicals and heating produces by-products which themselves, being unfiltered, can be pollutants that escape into the environment. One pollutant thus replaces another.

Test series with open particle filters that are being marketed as retrofits have amply demonstrated that the soot absorption rate attained is between 30% and 40%. Most of the retrofittable particle filters must be replaced after having been on the road for about 80,000 km.

It is the objective of this present invention to introduce an improved soot particle filter to clean exhaust gas. According to the invention that is accomplished with the features described in the independent claims. Advantageous configurations and enhancements are described in the subclaims.

A soot particle filter according to the invention is designed primarily for use in motor vehicles or in heating systems burning liquid and solid fuels. A special feature of the filtering device consists in a time-controlled variable regeneration of the soot particle collector and the burn-off of the soot particles. In addition the device works as a catalytic converter. The unit incorporates at least one filter housing with an intake port, an outlet and a filter element. The filter housing also contains at least one soot particle storage chamber. The latter is provided with an intake that is angled and tapered toward the inside. The interior of the soot particle storage chamber is lined with precious-metal disks. These disks are perforated, angled and/or corrugated. The precious-metal disks and the precious-metal mesh are at least in part coated with a catalyst. Positioned inside the filter housing is an ignition device such as a glow plug or a helical glow filament.

Primarily at the precious-metal disks the soot particles are burned with the aid of a glow plug and/or helical flow filament for example.

In advantageous fashion, after a cold start the soot particle filter according to the invention initially collects the soot particles. Subsequently, most of the accumulated soot particles are burned off, largely without the need for additional energy. The basic objective is thus achieved.

As another advantage, a soot particle filter according to the invention performs a continuous cleaning operation. In addition, by virtue of the disk-shaped alternating placement of the filter-disk elements, the device has an catalytic effect. This leads to an optimal reduction of such pollutants as CO, $NO_x$, $CO_2$ and soot particles, which are interdependent in terms of their relative proportion in the composition of the exhaust gas. Harmful exhaust gas is thus converted into harmless exhaust gas. The filter can be installed, in a relatively small enclosure and without a major installation effort, on a motor vehicle and/or in the flue of a heating-system. In diesel engines with a high cubic capacity, in particular several soot particle filters can be installed in a parallel array.

As another advantage of the soot particle filter according to the invention, the need for electric energy to burn off the soot particles is minimized. The soot particle filter according to the invention is largely maintenance-free and permits a nearly constant soot-particle burn-off rate over a sufficiently long operating cycle and useful life.

As yet another advantage, the soot particle filter according to the invention is of a technically simple, modular design. The soot particle filter offers high durability even when used with solid fuels.

A soot particle filter according to the invention is provided with a filter housing featuring an intake port and an outlet. The inside of the filter housing is lined with a refractory jacket shielding it from the outside. That jacket doubles as the retaining base for the filter elements. This jacket and filter-element arrangement serves to provide thermal insulation as well as to absorb and attenuate vibrations. It also reduces road-side heat generation. The internal components of the housing, jointly with the refractory jacket that holds the filter disks, are pressed as one unit into the housing.

The filter disks are perforated with through-holes in the direction of the particle storage chamber. Several such elements may be inserted one behind the other. A sequence of perforated filter disks creates continuous, open channels in the direction of the soot collection chamber, with perhaps at least one empty space interpositioned between them. The empty space or spaces may result in a better swirling of the exhaust gas and the soot particles. Channels extend through the filter disks at least over part but preferably all of the cross section of the soot collection chamber. Contaminated exhaust gas will flow only through part of the channels. The channels along the outer rim of the cross section of the soot collection chamber serve for the escape of the flow of decontaminated exhaust gas.

Positioning the filter disks one behind the other creates through-gaps to the outside. However, these gaps are kept so narrow that only exhaust gas can flow toward the outside. Carried by the exhaust-gas flow through the channels that extend toward the soot collection chamber, the soot particles are necessarily trapped in the soot collection chamber. Within the soot collection chamber the particles inevitably deposit themselves on the high-temperature-resistant precious-metal disks mounted in that chamber. These precious-metal disks are perforated, angled, corrugated and of varied fineness. The soot particles will deposit themselves primarily on the precious-metal disks.

As required, the soot collection chamber is so designed that a glow-filament ignition device can initiate a burn-off of the deposited soot particles. The ignition device is a resistance-type wire and/or a glow plug. The point in time at which the collection chamber is filled with soot is determined by the vehicle type, the distance traveled and/or with the aid of a back-pressure sensor. At that point the burn-off can be triggered by energizing the glow plug and/or resistance wire. The ignition is signaled by a lamp on the dashboard.

The pre-filter disks with a catalytic coating are located at the gas-flow intake. The entire volume of the exhaust-gas flow thus travels first along the catalyst-coated filter disks. These coated filter disks may optionally be staggered and coated with different precious metals. The filter disks cause the soot particles to be oxidized and exhaust gas to be converted. After the exhaust gas has flowed through the intake area, a funnel-shaped or tapered deflector will narrow the flow to where the cross section of the exhaust-gas flow cone, laden with soot particles, essentially matches the shape and cross section of the soot particle collection chamber. Most of the soot particles will thus be deposited in the soot collection chamber, there to be eliminated. To reduce any backflow and especially any backscattering of soot particles into the exhaust-gas flow, the intake port of the soot collection chamber is provided with a continuous bevel which may be rounded and/or canted. The volume capacity of the soot collection chamber must be so dimensioned that the burn-off of the soot particles will not damage the surrounding material due to the burn-off temperature. The precious-metal disks within the soot collection chamber are preferably coated with materials that aid the oxidation of the soot particles.

In a preferred arrangement, precious-metal-coated tiles and/or molded metal-mesh sections are installed. For larger exhaust gas volumes, the openings of the filter disks are provided with essentially horizontally projecting bushings. On one side, especially on the front face of the filter disk, these bushings feature a tongue and on the other side, in particular on the opposite back side, a groove, so that the disks can be precisely matched up and, if necessary, plugged together.

Most or, preferably, all of the soot-carrying channels of the filtering device lead into the soot collection chamber, with the exits of these soot-carrying channels terminating in and closed off by the soot collection chamber. The exhaust gas is forced to flow through the said bushings until it escapes through the horizontal openings, provided for that purpose and open to the outside. To prevent the exhaust gas flow from backing up, the grooves and/or tongues on the filter disks are preferably provided on their front surfaces with minute crowns, star- or box-shaped openings and slots.

For heat retention considerations the filter disks including the tongues and grooves are preferably produced from a porous ceramic material. Foam material may also be used for their production.

In heating systems burning solid fuels the exhaust-gas pressure is usually too low for feeding a filtering device. There, a blower is preferably installed ahead of the filter to ensure an adequate flow speed. For adaptation of the solid fuels in the furnace or oven the blower is preferably controlled by a continuously variable regulator that adjusts to the required calorific output.

Wetting the precious-metal disks in the soot collection chamber with a suitable liquid has been found to improve performance. Other experiments have shown that even a brief, controlled spraying will reduce the dry volume of the soot particles by ¾, correspondingly increasing the chamber capacity.

In most cases the exhaust gas flow does not contain enough oxygen for the burn-off. Therefore the soot collection chamber is preferably equipped with an air inlet valve with a demand-responsive control.

Other advantages and forms of implementation of the invention are illustrated in the attached drawings in which:

FIG. 4 is a top view of the base plate of a soot-particle filtering device depicted in FIG. 5;

FIG. 5 is a perspective view of another design version of the soot-particle filtering device according to the invention for use in the exhaust system of a motor vehicle.

Figure 1:
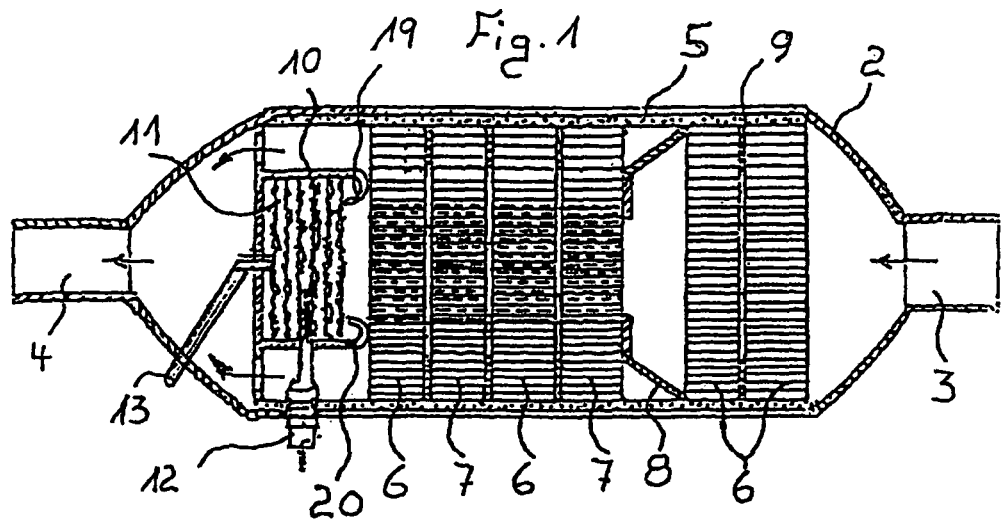
FIG. 1 is a section view of one design version of the soot-particle filtering device according to the invention.

FIG. 1 is a section view of a device for filtering-out soot particles and for decontaminating exhaust gas. A housing 2 has an intake port 3 and an outlet 4. That housing contains the elements, described below, for decontaminating the exhaust gas. For better thermal insulation as well as for a good fit the entire exhaust-gas purification assembly is pressed into the housing with the aid of ceramic pads 5. The filter disks 6 are plugged together as desired and are in part provided with a catalytic coating 7. In the intake area the entire volume of the filter disks is used for the filtering and exhaust-gas decontamination process. The filter disks are followed by a narrowing the outlet opening of which matches the intake opening of the soot collection chamber 10. From there the soot particles are trapped and collected by the precious-metal disks and/or precious-metal mesh 11 positioned in the soot collection chamber. From time to time the soot particles are burned off with the aid of a glow plug or helical glow filament 12. There is not always an adequate oxygen supply. Accordingly, the amount of oxygen or air needed for the burn-off is fed in via an oxygen valve 13.

Figure 2:
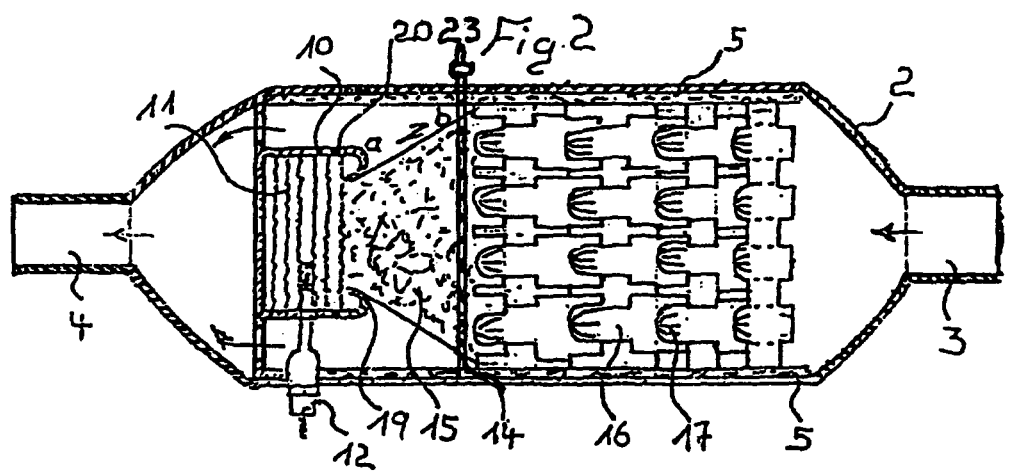
FIG. 2 is a section view of another design version of the soot-particle filtering device according to the invention.

FIG. 2 illustrates an inward-tapered funnel 14. This funnel shape directs the soot particles into the soot collection chamber. The mesh along the transition from b. to a. is kept fine enough to guide most or preferably all of the particles into the soot collection chamber. Stainless-steel chips 15 in the antechamber of the soot collection chamber help trap the soot particles. They also reduce any significant turbulence of the soot particles. Inside the housing perforated monolithic disks 16 are mounted in a row. On their front faces these monolithic filter disks are at least partly framed by continuous bushings or with tongues. The latter are provided with star-shaped notches, slots and small openings, designed to allow the exhaust-gas flow, decontaminated and without back-up and predominantly as a cross current, to escape to the outside. It is also possible to use the outer area of the housing as the filtering space, in which case the interior serves as the outlet. This type of configuration can be constructed using the above-described filter disks.

Figure 3:
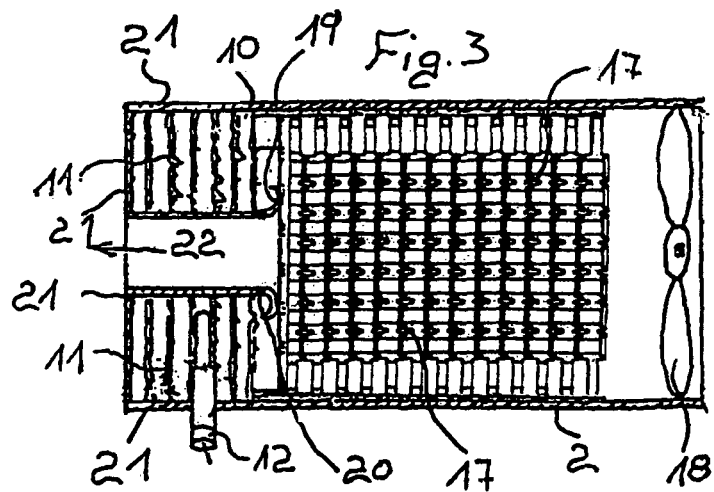
FIG. 3 is a section view of another design version of the soot-particle filtering device with a blower for solid fuels.

FIG. 3 depicts the example of a particle filter for a wood-burning oven with a blower 18 that controls the flow speed of the exhaust gas.

FIG. 5: On some motor vehicles there is not enough room for placing a particle filter in a specific location, for instance when the particle filter cannot be installed in an angled position. In a test series it was found that, used in lieu of filter disks, individual perforated pellets 25, produced from a ceramic and/or other refractory material 24, perform well. On one side of the opening these perforated refractory pellets feature a groove, on the opposite side a tongue, with the tongue and groove matched for a precise fit. Small occasional nubs 17 on the tongues allow more and/or less exhaust gas to pass through depending on the existing gaps. The pellets are strung on wires of the desired length, extending from the base plate 27. When all wire baskets are filled with pellets, the terminal plate 26 is mounted. One major advantage of this form of implementation, i.e. of the filtering device, is the flexibly variable composition of the individual components, especially of the pellets, which because of unavoidable vibrations cannot permanently block with soot particles. As another advantage, the wire baskets can be configured in various shapes. For example, a basket may have an undulating contour, the advantage being that, when installed in the undulating baskets, the pellets will necessarily follow the shape of the baskets. That can create a certain spin, causing the exhaust gas along with the particles to swirl.

The invention claimed is:

1. A soot particle filter for use in motor vehicles or in heating systems burning gaseous, liquid and/or solid fuels, with time-controllable variable regeneration of a soot article storage chamber, with soot particle burn-off provisions and with a catalytic conversion effect, comprising:
   at least one filter housing, one intake port, one outlet and one filter element, wherein the filter housing contains at least one soot particle storage chamber that is provided with an inward-angled and inward-tapered intake,
   wherein an interior of the soot particle storage chamber is lined with precious-metal disks which are perforated, angled and/or corrugated and/or which is lined with a precious-metal mesh,
   wherein the precious-metal disks and/or precious-metal mesh are at least in part provided with a catalytic coating,
   an ignition device comprising one or more of: a glow plug and a helical glow filament provided inside the filter housing; and
   a liquid atomizer connected to a liquid reservoir positioned in front of the particle storage chamber.

2. A soot particle filter for use in motor vehicles or in heating systems burning gaseous, liquid and/or solid fuels, with time-controllable variable regeneration of a soot particle storage chamber, with soot particle burn-off provisions and with a catalytic conversion effect, comprising:
   at least one filter housing, one intake port, one outlet and one filter element, wherein the filter housing contains at least one soot particle storage chamber that is provided with an inward-angled and inward-tapered intake,
   wherein an interior of the soot particle storage chamber is lined with precious-metal disks which are perforated, angled and/or corrugated and/or which is lined with a precious-metal mesh,
   wherein the precious-metal disks and/or precious-metal mesh are at least in part provided with a catalytic coating,
   an ignition device comprising one or more of: a glow plug and a helical glow filament provided inside the filter housing; and
   a fine-meshed funnel, positioned in front of the particle storage chamber, is tapered toward the inside.

3. The soot particle filter as in claim 2, characterized in that the funnel is at least partly filled with stainless-steel chips.

4. A soot particle filter for use in motor vehicles or in heating systems burning gaseous, liquid and/or solid fuels, with time-controllable variable regeneration of a soot particle storage chamber, with soot particle burn-off provisions and with a catalytic conversion effect, comprising:
   at least one filter housing, one intake port, one outlet and one filter element, wherein the filter housing contains at least one soot particle storage chamber that is provided with an inward-angled and inward-tapered intake,
   wherein an interior of the soot particle storage chamber is lined with precious-metal disks which are perforated, angled and/or corrugated and/or which is lined with a precious-metal mesh,
   wherein the precious-metal disks and/or precious-metal mesh are at least in part provided with a catalytic coating,
   an ignition device comprising one or more of: a glow plug and a helical glow filament provided inside the filter housing;
   wherein the filter housing contains perforated filter disks of a ceramic material,
   wherein the perforated filter disks in the filter housing are at least in part provided with a catalytic coating, and
   closed precious-metal disks of different diameters are placed between the filter disks in alternating fashion.

* * * * *